3,330,037
CUTTING TOOL
Kenneth H. Hoen, 2396 Orchard Lane, Littleton, Colo. 80120, and Walter J. Chapman, 1600 S. Columbine, Denver, Colo. 80210
Filed Mar. 26, 1965, Ser. No. 443,134
7 Claims. (Cl. 30—180)

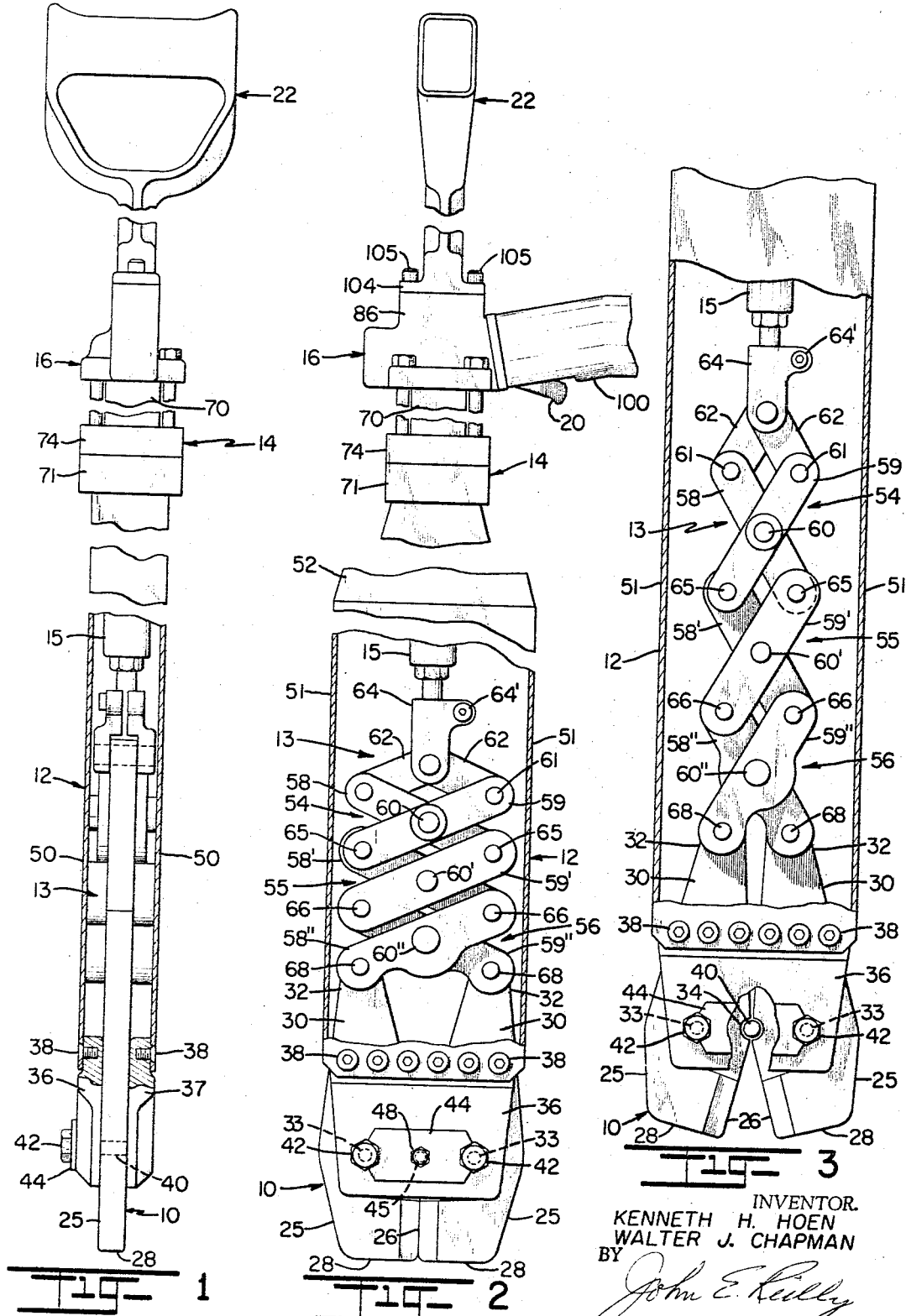

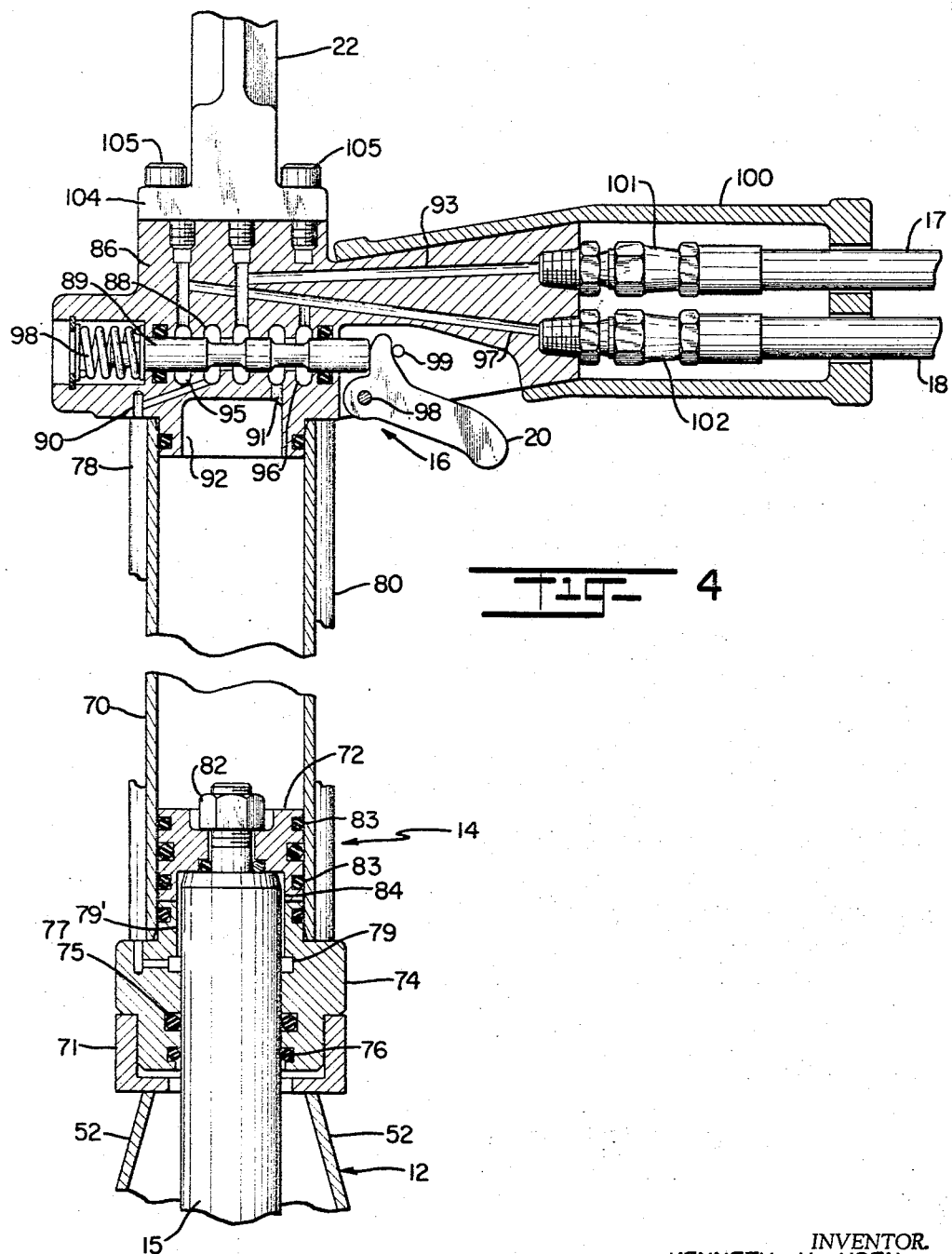

This invention relates to novel and improved power tools; and more particularly relates to a portable cutting tool which is adaptable for use in cutting metal objects of limited size or diameter, such as, rebar, bolts, rivets and the like.

It is an object of the present invention to provide a portable power tool in which the force of a driving member is transmitted and multiplied within a limited space in a novel and improved manner for the purpose of actuating a driven member through a short, powerful working stroke; and furthermore wherein the tool is compact and easily maneuverable in tight or restricted places.

It is a further object of the present invention to provide a lightweight, portable power tool which can be conveniently carried and operated by a single person, is safe and easy to handle in operation, and further which is compact particularly in relation to the forces transmitted and applied in cutting.

It is a still further object of the present invention to provide a portable cutting tool being characterized by having a compound linkage assembly so constructed and arranged between a pair of cutter jaws and a reciprocating member as to be capable of converting within a relatively narrow space the working strokes of the reciprocating member into short powerful cutting strokes; and in such a way that the force of the cutting elements is rapidly increased in approaching the end of each stroke whereby to avoid jamming and to insure a clean accurate cut.

The above and other objects, advantages and features of the present invention will become more readily understood and appreciated from a consideration of the following detailed description when taken together with the accompanying drawings in which:

FIGURE 1 is an elevational view, partially in section, of a preferred form of cutting tool in accordance with the present invention.

FIGURE 2 is an enlarged view, partially in section, illustrating the relative disposition and arrangement between parts when the cutter jaws are in the closed position.

FIGURE 3 is an enlarged view, partially in section, illustrating the relative disposition and relationship between parts when the cutting jaws are in the open position; and FIGURE 4 is a section view in detail of the power mechanism for the preferred form of cutting tool.

Referring in detail to the drawings, the preferred form of cutting tool, as shown in FIGURES 1 to 4, is illustrated as being hydraulically operated and is broadly comprised of a pair of cutter jaws 10 pivoted at the lower end of an elongated generally rectangular housing 12. The housing defines a hollow support for the cutter jaws 10 which are controlled in movement by a compound linkage assembly 13, the latter being enclosed within the housing and actuated by a hydraulic cylinder assembly 14 at the upper end of the housing 12. The cylinder assembly 14 is energized to reciprocate a driving member in the form of a downwardly projecting piston rod 15 which through extension and contraction of the compound linkage assembly will control opening and closing of the cutter jaws, respectively. The hydraulic cylinder assembly is selectively controlled by a valve unit 16 positioned across the upper end of the assembly 14 with pressure and return lines 17 and 18 leading from a suitable source of hydraulic pressure, not shown, and a trigger 20 being mounted on the valve body to manually operate the valve in controlling operation of the tool. An upper handle portion 22 is positioned on the valve body so that the unit may be hand-carried and conveniently operated at the desired point of use. Further, the unit preferably utilizes a source of hydraulic fluid under pressure for operation of the power mechanism, such as, a hydraulic reservoir or tank; and the pressure and return lines are of sufficient length to permit use of the tool at locations away from the pressure source.

Considering in more detail the construction and arrangement of the cutter jaws 10, each jaw is formed with a relatively wide forwardly extending cutter blade 25 having a straight, longitudinal cutter edge 26 and squared end surface 28, together with a relatively long rearwardly divergent lever arm 30 terminating in a pivotal end 32. The pivotal axis of each jaw is located through a bolt hole 33 between the cutter blade 25 and lever arm 30 at the wider section of the jaw, and a semi-circular guide slot or opening 34 is provided on the inner surface directly opposite the bolt hole 33.

The jaws are assembled for pivotal movement at the lower end of the housing by insertion between a pair of spaced side bars 36 and 37, the latter being rigidly connected to opposite sides of the housing by suitable means, such as, cap screws 38. The cutter jaws 10 are inserted through the narrow entrance formed by the bars 36 and 37 with the lever arms 30 projecting upwardly into the housing, and the cutter blade edges 26 are disposed in inwardly facing relation to one another for angular movement between an open position, as shown in FIGURE 3, and a closed position, as shown in FIGURE 2, in performing each cutting stroke. The semi-circular openings 34 are aligned to form a common opening for insertion of a cylindrical pin 40, and pivot pins in the form of bolts 42 are inserted through openings in the side bars 36 and 37 and through the bolt holes 33 for pivotal opening and closing movement of the cutter blades in response to actuation of the lever arms in a manner to be described. In this relation, it will be noted that the pin 40 is centered between the bolts 42 to properly align the jaws for synchronous opening and closing movement in pivoting about the bolt members 42. To retain the pin 40 in place, a locking plate 44 is positioned on the outer surface of the side bar 36 with a bore 45 placed over a limited opening in the bar 36 for insertion of the pin 40, and a suitable cap screw 48 is threaded inwardly a limited distance merely to close the opening. In this manner, the pin is free to shift with the jaws while correlating cutter blade movement between the closed and open positions.

The housing 12 defines a hollow support for the compound linkage assembly 13, and in the relationship shown is of narrow rectangular configuration with elongated side plates 50 interconnected by elongated relatively narrow end plates 51 and with upper continuations 52 of the sides converging into the hydraulic cylinder assembly 14. Here it will be seen that the housing is proportioned in width to permit free lateral movement of the lever arms 30 and the compound link assembly 13 and in length to permit a full working stroke of the piston rod and link assembly between the extended position illustrated in FIGURE 3 and the contracted position illustrated in FIGURE 2.

To minimize the size of the tool and of the individual elements required to produce a given force at the cutter blades, it is highly important that the applied force of the power mechanism be multiplied the maximum number of times within the least possible space; and in particular that the cross-sectional area of the housing be held to a minimum for ease of handling and use in limited areas.

To this end, an important feature of the present invention resides in the construction and arrangement of the compound link assembly within the housing and which generally in response to longitudinal movement of the piston rod 15 toward the cutter jaws will greatly multiply the applied force of the rod in urging the cutter jaws through each cutting stroke. In the preferred form the compound link assembly is comprised of a series of three intersecting link pairs 54, 55 and 56 arranged in end-to-end relation within the housing between the piston rod 15 and lever arms 30. Essentially, the links of each pair are pivotally interconnected at their centers to one another and pivotally connected at their ends to ends of each next adjacent link pair in succession; and the upper terminal ends are pivotally secured to the piston rod and the lower terminal ends pivotally secured to the pivotal ends 32 of the lever arms 30. According to space and length requirements, addition of each link pair for a given applied force of the plunger or piston rod will enable an incremental increase in length of working stroke of the piston rod and a corresponding increase in the applied force transmitted through the link pairs to the lever arms. Thus the intersecting link pairs individually may be of relatively short length but in end-to-end relation will translate the relatively long working stroke of the piston rod into a relatively short, powerful cutting stroke. In this way, the cross-sectional working area required for the linkage assembly need be no greater than that of the lever arms, as illustrated in the drawings; yet the assembly is capable of multiplying the force of the piston rod to the extent required to effect a powerful cutting stroke.

As shown in FIGURES 2 and 3, the upper link pair 54 has intersecting links 58 and 59 pivotally connected at their centers by a pivot pin 60 symmetrically about the longitudinal axis of the tool. Upper ends of the links are pivotally connected at 61 to terminal link members 62 which in turn are pivotally connected to a clevis 64 at the lower end of the piston rod 15. Similarly, the intermediate link pair 55 consists of intersecting link members 58′ and 59′ connected at their centers by pivot pin 60′ and their upper ends are pivotally connected as at 65′ to lower ends of the link pair 54. The lower link pair 56 correspondingly consists of intersecting links 58″ and 59″ pivotally connected at their centers by pivot pin 60′ with upper ends being pivotally connected at 66 to the lower ends of the link pair 55, and the lower ends of the link pair 56 being pivotally connected as at 68 to the upper pivotal ends 32 of the lever arms 30. It will be noted that the link pairs are most desirably of progressively increasing width and strength toward the lever arms to withstand the increase in force transmitted from the piston rod to the cutter jaws. Moreover, the link assembly 13 is arranged symmetrically about the longitudinal axis of the tool so that the applied force is evenly distributed between the lever arms 30 in actuating the cutter jaws. Thus, the applied force of the piston rod in its working stroke is effectively imparted through the intersecting link members to cause spreading action of the lever arms 30 about the pivotal axes of the jaws in forcing the cutter blades 28 through each cutting stroke. Again, addition of each link pair will permit an incremental increase in the length of working stroke of the piston which is translated into a corresponding increase in force applied to the cutter jaws.

The length of stroke can be closely adjusted by means of clevis 64 which is adjustably secured to the lower end of the piston rod by a locking nut 64′. Thus, the stroke of the piston rod may be lengthened or shortened slightly, for instance, to compensate for wear and to insure proper cutting action between the blades in moving between the open and closed position. In this connection, most desirably the blade edges will not abut or contact one another at the end of the stroke to avoid damaging the blade and accordingly the length of stroke of the piston rod should be regulated such that the blade edges will stop just short of engagement with one another at the end of each stroke. In accordance with the present invention, of particular advantage is the fact that the forces applied through the cutter blades will be greatest as the blades approach the end of the cutting stroke, since the components of force applied from the piston rod through the linking assembly will act more nearly in a perpendicular direction to the lever arms as the link pairs are urged from a relatively steep angle to a flat angle to one another by the piston rod. The importance of this will be recognized for example in cutting circular objects since due to the increasing cross-sectional area of the object toward the center it will impose increasing resistance to the cutting action of the blades toward the ends of the stroke and will be effectively counteracted by the increasing force of the cutter blades as imparted by the linkage assembly.

As shown in FIGURE 4, the power mechanism is defined by the hydraulic cylinder assembly 14 mounted in coaxial relation to the upper end of the housing 12, and is comprised broadly of a cylinder tube 70 having a lower genetrally cup-shaped connecting end 71 permanently attached to the upper end of the housing 12 and with the valve unit 16 positioned across the upper end of the cylinder 70 and in communication with opposite ends of the cylinder to selectively control reciprocation of piston 72 and its attached piston rod 15. A rod end head 74 is inserted within the recessed portion of the connecting end 71 to form a packing sleeve assembly, suitably provided with an O-ring 75 and wiper ring 76 for the piston rod; and a port 79 is formed at the upper end of the head 74 in communication through a groove 77 with a rod end feed tube 78. The feed tube extends longitudinally of the cylinder assembly along the external surface of the cylinder tube from the valve 16 into the rod end head 74, and the valve unit 16 and head 74 are also interconnected by elongated cylinder bolts 80 spaced at circumferential intervals about the external surface of the cylinder. The piston 72 is secured to the upper end of the piston rod 15 by an end nut 82 and has piston rings 83 on its external surface establishing sealed relation with the inner surface of the cylinder 70. It will be noted that the port 79 in the rod end head 74 communicates through annular groove 79′ with the interior of the cylinder; and the groove 79′ is aligned to communicate with an annular groove 84 between the piston rod 15 and piston when the piston is abutting the end of the rod end head, in order to initiate return or upward movement of the piston through the cylinder when fluid under pressure is delivered through the outer feed tube into the port 79.

The valve unit 16 includes a valve body 86 disposed transversely across the upper end of the cylinder and which includes a central chamber 88 with a valve spool element 89 arranged for sliding movement through the valve chamber in response to movement of the control trigger 20. The valve chamber communicates through pressure port 90 with the feed tube 78, leading to the lower end of the cylinder, and through pressure port 91 to a cavity 92 which is formed within the valve body to receive the piston head 72 at its upper end limit of travel. Each of the ports 90 and 91 communicates through grooves 93 in the valve chamber with pressure line 17 which suitably receives fluid under pressure from the hydraulic pressure source, not shown. In turn, exhaust ports 95 and 96 at opposite ends of the valve chamber communicate through a common groove 97 with the return line 18 leading to the pressure source. Normally, the valve spool is biased, by means of spring element 98 at one end thereof, to a position establishing communication from the pressure line 17 through port 90 with the lower end of the cylinder to pressurize the piston in the return or upward direction of movement toward the upper end of the cylinder, and in which relation the exhaust port 96 establishes communication between the upper end of the cylinder and the return line.

To actuate the piston and piston rod through the working stroke, the valve spool is shifted against the biasing spring to a position establishing communication between the pressure line 17 and upper end of the cylinder and between the lower end of the cylinder through the feed tube 78, and the return line 18. For this purpose, the trigger 20 is pivotally mounted by means of a pin 98 with a stop element 99 positioned behind the upper projecting end of the trigger to limit its movement in the releasing direction under the return force of the spring 98. By squeezing or pivoting the trigger 20 upwardly the end of the valve spool is engaged to slide to a position closing port 90 and opening port 91 communicating with the upper end of the cylinder, as well as closing exhaust port 96 and opening exhaust port 95 to the lower end of the piston. When the trigger is released the valve spool 95 will of course return to its original position causing return movement of the piston to the upper end of the cylinder. An outer sleeve portion 100 encloses one end of the valve body as well as hose connections 101 and 102 for the lines 17 and 18, and serves also as a handle portion for use with the upper handle portion 22 in operating the tool. The handle 22 is disposed in coaxial relation to the tool and for this purpose has a connecting flange 104 at its lower end which is attached to the upper end of the valve body by means of suitable cap screws 105. Thus by grasping the upper handle portion 22 and the sleeve portion 105 the tool may be easily manipulated into position for cutting. In use, the downward working stroke of the piston, when the trigger 20 is squeezed, will longitudinally contract the link pairs 54, 55 and 56 to spread the lever arms 30 and force the cutter blades 25 inwardly through a cutting stroke. Again, the working area of the cylinder assembly is relatively small in relation to the force transmitted through the lever arms to perform each cutting stroke, since the force is multiplied through each link pair in succession within a limited cross-sectional area, and thereby eliminates the bulk or size required in carrying relatively large simple links or moment arms.

From the foregoing, it will be apparent that the cutting tool devised in accordance with the present invention is capable of translating or converting the relatively long stroke of a drive member into a relatively short, powerful cutting stroke, the multiplication in force being accomplished through a limited cross-sectional area by the compound link assembly and the force applied to the cutter jaws rapidly increasing as the cutter blades near the end of each cutting stroke. For the purpose of illustration and not limitation and by reference to the preferred form of invention, where the cutter jaws are sized for cutting metal objects of approximately ¾ inch in diameter, and given an effective piston area on the order of 2.4 square inches working under a pressure of 2000 pounds per square inch, the resultant force of the rod would be 4800 pounds. Assuming that the length of stroke of the piston rod is 7½ inches, initial multiplication of force through the compound linkage assembly, where the intersecting link pairs are at a relatively low angle to the longitudinal axes as shown in FIGURE 3, would be aproximately a ratio of 5 to 1; or in other words, the force applied at the cutter edges would be on the order of 24,000 pounds. However in approaching the end of each cutting stroke the force of the rod as applied through the compound linkage assembly will rapidly increase to a maximum as the link pairs are advanced through an increasingly greater angle to the longitudinal axis and, for example, the multiplication ratio toward the end of each stroke would be on the order of 40 to 1 resulting in an applied force at the cutter edges of 192,000 pounds. Again, the force relationship as set forth is given as being merely illustrative based onthe relationship between parts for a given size of cutter blade, and would of course vary in accordance with the length of working stroke of the piston rod and the number of link pairs interposed between the piston rod and lever arms. Adaptation of this to other practical uses than in cutting operations will be readily apparent; and in particular where it is desired to convert the relatively long stroke of a drive member into a short powerful stroke or movement to perform work, such as, in various types of portable power tools. Moreover, other suitable power sources may be utilized in place of the hydraulic cylinder assembly and depending upon the forces required may either be hand or power operated.

It is, therefore, to be understood that various modifications and changes may be made in the construction and arrangement of parts comprising the present invention without departing from the spirit and scope thereof as defined by the appended claims.

What is claimed is:

1. In a power tool having a housing, a pair of jaws pivotally connected at one end of the housing with a pair of lever arms movable to control opening and closing movement of the jaws, and a reciprocal driving member including means to reciprocate said driving member at the opposite end of the housing toward and away from the lever arms, the improvement comprising a plurality of intersecting link pairs being pivotally connected to one another in end-to-end relation between the driving member and said lever arms, and being operative in response to movement of said driving member to multiply the force of said driving member through said lever arms to effect opening and closing movement of said jaws, said link pairs being characterized by being movable in response to movement of said driving member toward said lever arms to progressively increase the force applied through said lever arms to effect closing movement of said jaws.

2. In a power tool according to claim 1, said jaws being pivotally connected in non-intersecting, side-by-side relation and intersecting link pairs having terminal connecting links at one end being pivotally connected to said driving member, and the oposite terminal ends of said link pairs being pivotally connected to said lever arms, the links of each pair being pivotally connected to one another at their centers and said links being proportioned in length to occupy a space corresponding to the spacing between said lever arms in controlling the movement of said jaws.

3. In a cutting tool, a pair of pivotal cutter jaws including lever arms movable to control opening and closing movement of said jaws, a reciprocal driving member having means to reciprocate said driving member toward and away from said lever arms, and a compound link assembly having a plurality of intersecting link pairs being pivotally connected to one another in end-to-end relation between said driving member and said lever arms, said intersecting link pairs being movable in response to movement of said driving member toward said lever arms to advance from a first position in which the links of each pair are aligned at a relatively low angle to the path of travel of said driving member to a second position in which the links of each pair are aligned substantially normal to the path of travel of said driving member and means pivotally supporting said cutter jaws for transmitting the force of said driving member through said lever arms to effect closing movement of said jaws, in response to advancement of said intersecting link pairs from the first to the second position.

4. In a cutting tool according to claim 3, said intersecting link pairs being arranged symmetrically about the longitudinal axis of said driving member, and the links of each pair being pivotally connected at their centers for angular movement between the first and second positions.

5. A portable cutting tool for cutting metal objects comprising an elongated housing, a pair of cutter jaws being mounted for pivotal movement in side-by-side relation at the lower end of said housing symmetrically about the longitudinal axis to define a pair of forwardly extending cutter blades and rearwardly extending lever arms terminating in pivotal ends enclosed within said housing, a power mechanism mounted at the upper end of said housing having a cylinder and a piston slidable therein and being axially aligned with said housing with a piston rod projecting downwardly for reciprocal movement through said housing in response to slidable movement of said piston, a source of hydraulic fluid under pressure, a control valve disposed transversely of the upper end of said cylinder for controlling the flow of fluid to and from said cylinder to actuate said piston rod, and a compound link assembly being defined by a plurality of intersecting link pairs pivotally connected to one another in end-to-end relation between the lower end of said piston rod and the pivotal ends of said lever arms within said housing to control opening and closing of said cutter blades in response to reciprocal movement of said piston rod through said housing.

6. A portable cutting tool according to claim 5, further including a first handle portion mounted above said control valve and a second handle portion forming a transverse extension of said control valve.

7. A portable cutting tool according to claim 5, said compound link assembly including terminal connecting links pivotally connected to the lower end of said piston rod, and adjusting means between said connecting links and said piston rod to adjust the effective length of stroke of said piston rod.

References Cited

UNITED STATES PATENTS

| | | | |
|---|---|---|---|
| 736,671 | 8/1903 | Aksila | 30—252 X |
| 1,129,267 | 2/1915 | Biard | 30—180 |
| 1,275,659 | 8/1913 | Cartwright | 30—180 |
| 1,445,969 | 2/1923 | Matheson | 294—119 |
| 1,727,245 | 9/1929 | Miller | 294—119 X |

WILLIAM FELDMAN, *Primary Examiner.*

J. C. PETERS, *Assistant Examiner.*